United States Patent
Payne

(10) Patent No.: US 8,974,938 B2
(45) Date of Patent: Mar. 10, 2015

(54) BATTERY SYSTEM AND METHOD FOR COUPLING A BATTERY CELL ASSEMBLY TO AN ELECTRICALLY NON-CONDUCTIVE BASE MEMBER

(75) Inventor: Josh Payne, Royal Oak, MI (US)

(73) Assignee: LG Chem, Ltd., Seoul (KR)

(*) Notice: Subject to any disclaimer, the term of this patent is extended or adjusted under 35 U.S.C. 154(b) by 109 days.

(21) Appl. No.: 13/537,098

(22) Filed: Jun. 29, 2012

(65) Prior Publication Data

US 2013/0052503 A1    Feb. 28, 2013

Related U.S. Application Data

(60) Provisional application No. 61/528,963, filed on Aug. 30, 2011.

(51) Int. Cl.
*H01M 2/10* (2006.01)
*H01M 2/20* (2006.01)

(52) U.S. Cl.
CPC ...... *H01M 2/10* (2013.01); *H01M 2/20* (2013.01); *Y02E 60/12* (2013.01)
USPC ............................... 429/99; 429/100; 29/428

(58) Field of Classification Search
CPC .................................. H01M 2/10; H01M 2/20
USPC ............ 429/148–170, 99–100; 439/500, 627; 29/428
See application file for complete search history.

(56) References Cited

U.S. PATENT DOCUMENTS

| | | |
|---|---|---|
| 4,409,304 A | 10/1983 | Gerard et al. |
| 5,503,948 A | 4/1996 | Mackay et al. |
| 5,639,571 A | 6/1997 | Waters et al. |
| 5,856,041 A | 1/1999 | Inoue et al. |
| 6,023,146 A * | 2/2000 | Casale et al. .................. 429/159 |
| 6,261,719 B1 * | 7/2001 | Ikeda et al. .................. 429/160 |
| 6,521,363 B1 | 2/2003 | Yeh |

(Continued)

FOREIGN PATENT DOCUMENTS

| | | |
|---|---|---|
| EP | 1089373 A | 4/2001 |
| EP | 1505670 A2 | 2/2005 |

(Continued)

OTHER PUBLICATIONS

International Search Report for International Patent Application No. PCT/KR2009/003438 dated Jan. 22, 2010.

(Continued)

*Primary Examiner* — Milton I Cano
*Assistant Examiner* — Ling R Zeng
(74) *Attorney, Agent, or Firm* — Buckert Patent & Trademark Law Firm, PC; John F. Buckert

(57) ABSTRACT

A battery system is provided. The battery system includes a first battery cell assembly having first and second interconnect members. The first and second interconnect members have first and second blades, respectively. The battery system further includes an electrically non-conductive base member having first and second grooves. The battery system further includes first and second bus bar members disposed in the first and second grooves, respectively. The first bus bar member has a first aperture configured to removably receive the first blade therein. The second bus bar member has a second aperture configured to removably receive a second blade therein.

17 Claims, 14 Drawing Sheets

(56) References Cited

U.S. PATENT DOCUMENTS

| | | |
|---|---|---|
| 6,555,264 B1 | 4/2003 | Hamada et al. |
| 6,773,301 B1 | 8/2004 | Chaskin |
| 7,229,327 B2 | 6/2007 | Zhao et al. |
| 7,270,576 B2 | 9/2007 | Kim et al. |
| 7,270,912 B2 | 9/2007 | Oogami |
| 7,294,020 B2 | 11/2007 | Zhao et al. |
| 7,507,124 B2 | 3/2009 | Kim |
| 7,563,137 B1 | 7/2009 | Koetting et al. |
| 7,578,702 B1 | 8/2009 | Tom et al. |
| 7,642,746 B2 | 1/2010 | Kim et al. |
| 7,762,848 B2 | 7/2010 | Koetting et al. |
| 8,035,986 B2 | 10/2011 | Koetting et al. |
| 2001/0049055 A1* | 12/2001 | Saito ............................ 429/175 |
| 2003/0027039 A1 | 2/2003 | Benson et al. |
| 2003/0213121 A1 | 11/2003 | Rouillard et al. |
| 2004/0043663 A1 | 3/2004 | Ikeda et al. |
| 2005/0031945 A1 | 2/2005 | Morita et al. |
| 2005/0130033 A1 | 6/2005 | Iwamura et al. |
| 2006/0127754 A1 | 6/2006 | Hamada et al. |
| 2006/0177733 A1 | 8/2006 | Ha et al. |
| 2006/0194101 A1 | 8/2006 | Ha et al. |
| 2006/0234558 A1 | 10/2006 | Li |
| 2006/0246781 A1 | 11/2006 | Yoon et al. |
| 2007/0238018 A1 | 10/2007 | Lee et al. |
| 2008/0124617 A1 | 5/2008 | Bjork |
| 2008/0169788 A1 | 7/2008 | Bobbin et al. |
| 2008/0254356 A1 | 10/2008 | Liersch et al. |
| 2009/0139781 A1 | 6/2009 | Straubel |
| 2009/0325042 A1 | 12/2009 | Koetting et al. |
| 2010/0062329 A1 | 3/2010 | Muis |
| 2010/0247998 A1 | 9/2010 | Hostler et al. |
| 2011/0293994 A1 | 12/2011 | Casoli |
| 2012/0088140 A1 | 4/2012 | Kardasz et al. |
| 2013/0029204 A1 | 1/2013 | Khakhalev et al. |
| 2013/0052503 A1 | 2/2013 | Payne |
| 2013/0052511 A1 | 2/2013 | Khakhalev |
| 2013/0216878 A1 | 8/2013 | Merriman et al. |

FOREIGN PATENT DOCUMENTS

| | | |
|---|---|---|
| GB | 2084390 A | 4/1982 |
| JP | 2000123802 A | 4/2000 |
| JP | 2000164200 A | 6/2000 |
| JP | 2002252036 A | 9/2002 |
| JP | 2003282044 A | 10/2003 |
| JP | 2004055492 A | 2/2004 |
| JP | 2004178860 A | 6/2004 |
| JP | 2007265945 A | 10/2007 |
| KR | 20020051742 A | 6/2002 |
| KR | 20020064366 A | 8/2002 |
| KR | 20060110408 A | 10/2006 |
| KR | 20070057662 A | 6/2007 |
| KR | 20070100555 A | 10/2007 |
| KR | 20080027504 A | 3/2008 |
| KR | 20080027505 A | 3/2008 |
| KR | 20080036258 A | 4/2008 |
| KR | 20090095949 A | 9/2009 |
| KR | 100996957 B1 | 1/2010 |
| KR | 101042611 B1 | 1/2010 |
| KR | 20100003146 A | 1/2010 |
| KR | 101050318 B1 | 10/2010 |
| WO | 0030190 A | 5/2000 |

OTHER PUBLICATIONS

International Search Report for International Patent Application No. PCT/KR2009/003440 dated Jan. 22, 2010.

U.S. Appl. No. 13/193,169, filed Jul. 28, 2011 entitled "Battery Modules Having Interconnect Members with Vibration Dampening Portions".

U.S. Appl. No. 13/222,492, filed Aug. 31, 2011 entitled "Interconnection Assemblies and Methods for Forming the Interconnection Assemblies in a Battery Module".

International Search Report for International application No. PCT/KR2012/006812 dated Feb. 27, 2013.

International Search Report for International application No. PCT/KR2012/006813 dated Feb. 14, 2013.

International Search Report for International application No. PCT/KR2013/001174 dated May 13, 2013.

* cited by examiner

BATTERY SYSTEM AND METHOD FOR COUPLING A BATTERY CELL ASSEMBLY TO AN ELECTRICALLY NON-CONDUCTIVE BASE MEMBER

CROSS-REFERENCE TO RELATED APPLICATIONS

This application claims priority to U.S. Provisional Patent Application No. 61/528,963 filed on Aug. 30, 2011, the entire contents of which are hereby incorporated by reference herein.

BACKGROUND

Battery systems have utilized battery modules to generate electrical power. However, when coupling a battery module to an electrical bus, numerous brackets and bolts have been utilized which is relatively labor-intensive.

The inventor herein has recognized a need for an improved battery system that minimizes and/or eliminates the above-mentioned deficiency.

SUMMARY

A battery system in accordance with an exemplary embodiment is provided. The battery system includes a first battery cell assembly having first and second interconnect members. The first and second interconnect members have first and second blades, respectively. The battery system further includes an electrically non-conductive base member having first and second grooves. The battery system further includes first and second bus bar members disposed in the first and second grooves, respectively, of the electrically non-conductive base member. The first bus bar member has a first aperture configured to removably receive the first blade therein. The second bus bar member has a second aperture configured to removably receive the second blade therein.

A method for coupling a first battery cell assembly to an electrically non-conductive base member in accordance with another exemplary embodiment is provided. The first battery cell assembly has first and second interconnect members. The first and second interconnect members have first and second blades, respectively. The method includes disposing the electrically non-conductive base member on a surface. The electrically non-conductive base member has first and second grooves that hold first and second bus bar members, respectively, therein. The first bus bar member has a first aperture, and the second bus bar member has a second aperture. The method further includes disposing the first battery cell assembly on the electrically non-conductive base member such that the first blade is removably received in the first aperture, and the second blade is removably received in the second aperture.

DETAILED DESCRIPTION

Figure 1:
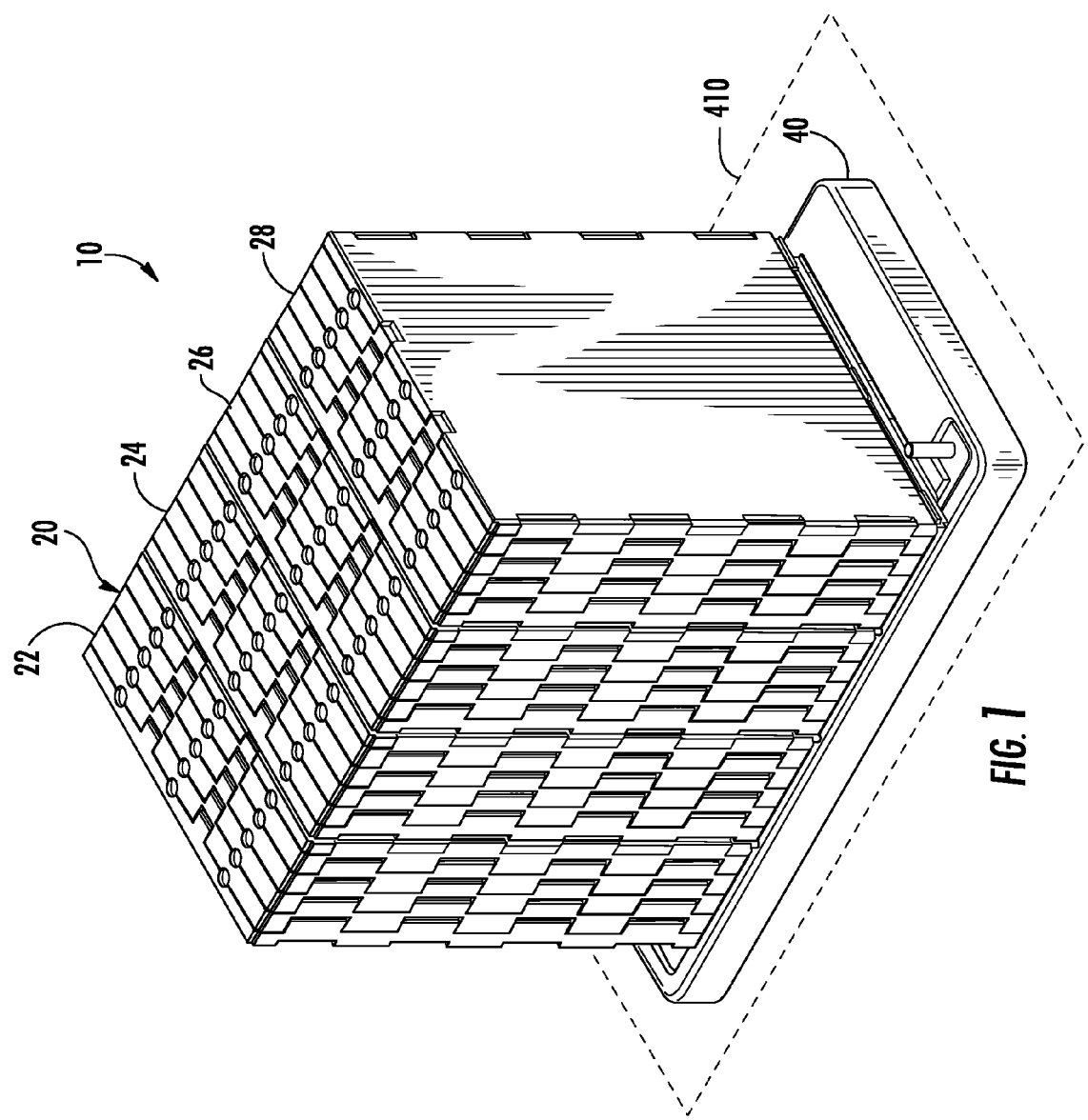
FIG. 1 is a schematic of a battery system in accordance with an exemplary embodiment.
Figure 2:
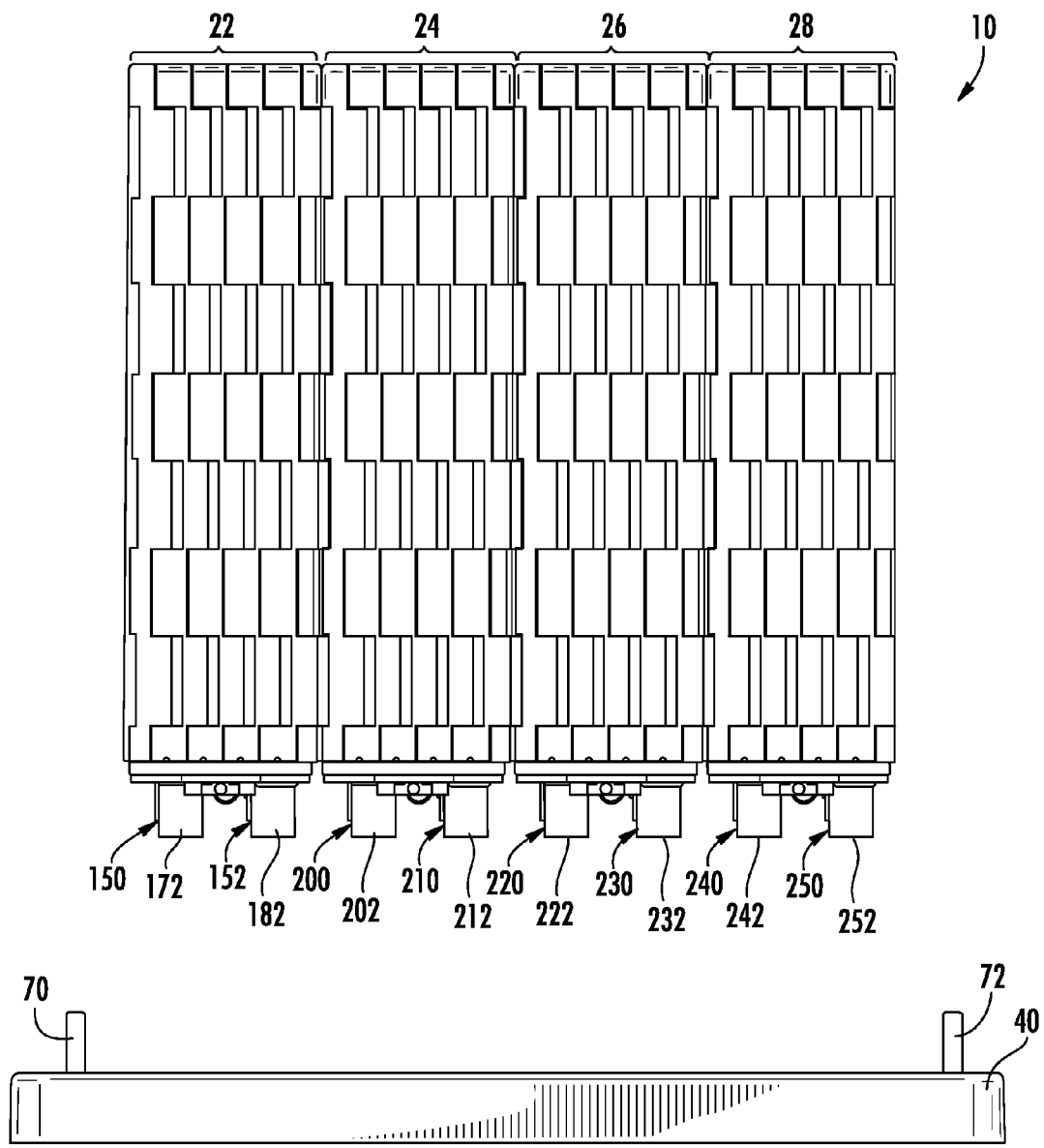
FIG. 2 is an exploded view of the battery system of FIG. 1 illustrating a plurality of battery cell assemblies and an electrically non-conductive base member.
Figure 3:
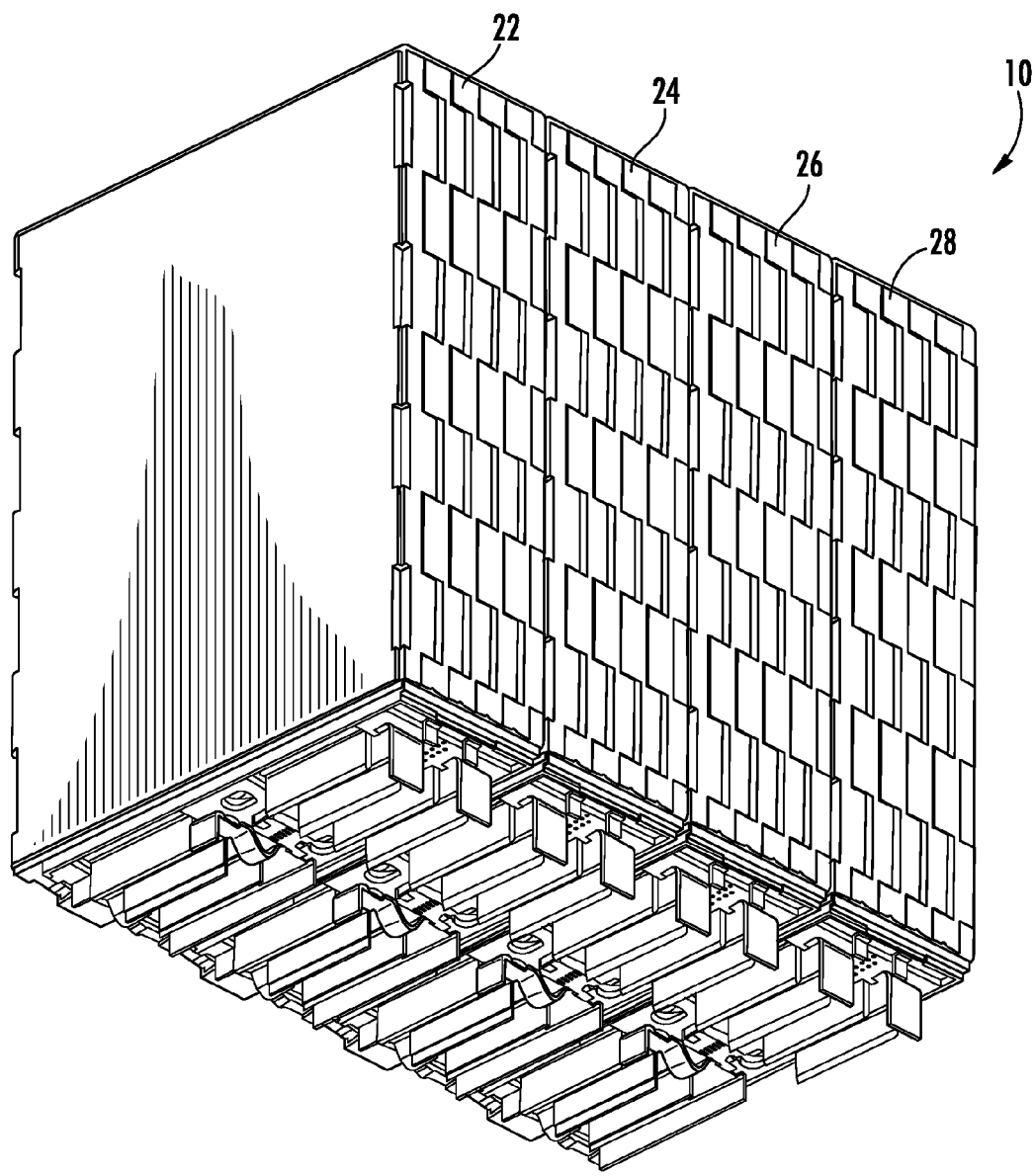
FIG. 3 is a schematic of the plurality of battery cell assemblies in the battery system of FIG. 1.
Figure 7:
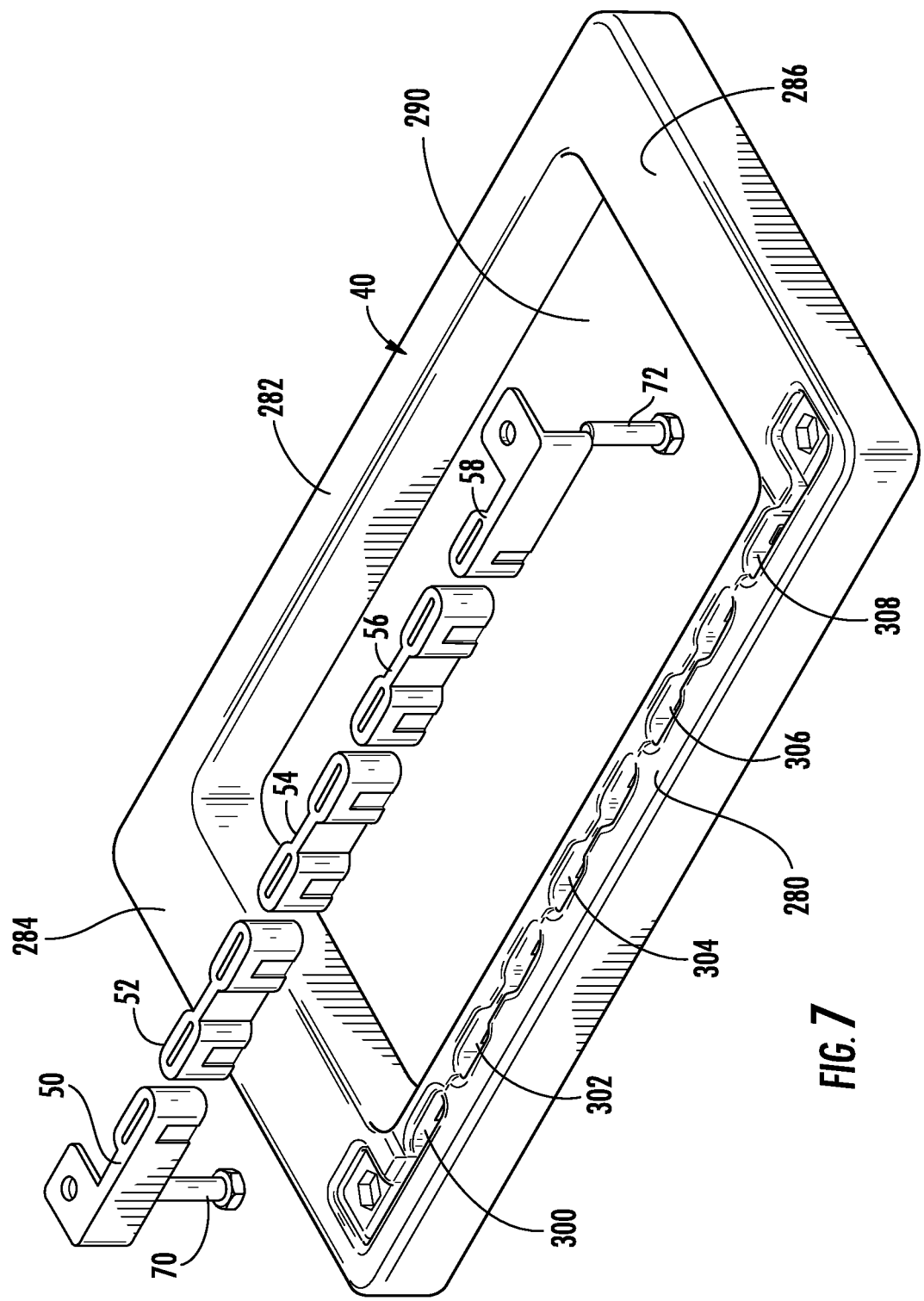
FIG. 7 is a schematic of an electrically non-conductive base member and a plurality of bus bar members utilized in the battery system of FIG. 1.

Referring to FIGS. 1, 2, and 7, a battery system 10 in accordance with an exemplary embodiment is illustrated. The battery system 10 includes a battery module 20 having battery cell assemblies 22, 24, 26, 28, an electrically non-conductive base member 40, bus bar members 50, 52, 54, 56, 58, and bolts 70, 72. An advantage of the battery system 10 is that the battery cell assemblies 22, 24, 26, 28 can be removably coupled to the bus bar members 50, 52, 56, 58 by simply inserting blades of interconnect members associated with the battery cell assemblies into the bus bar members.

Figure 4:
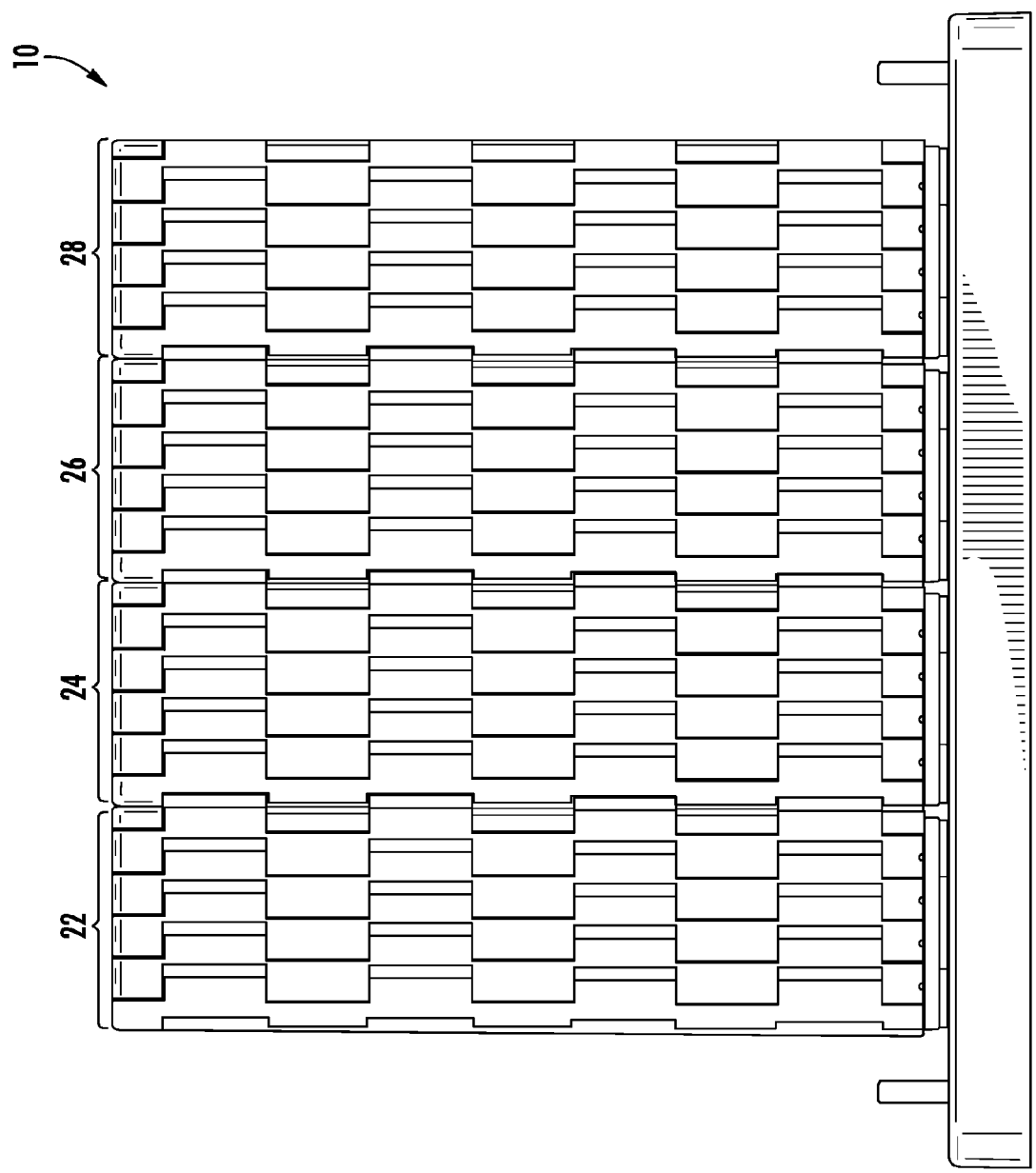
FIG. 4 is a side view of the battery system of FIG. 1.
Figure 5:
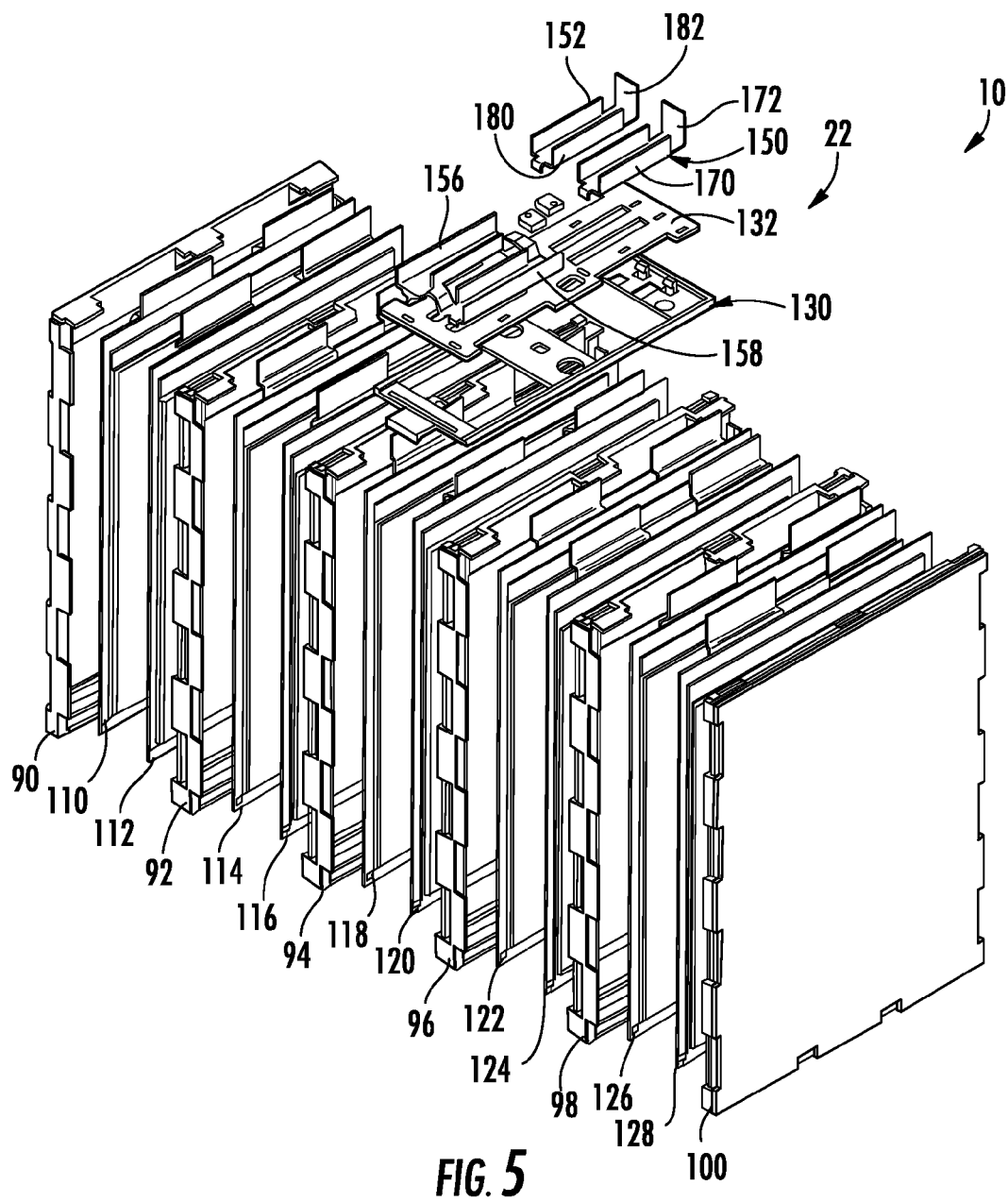
FIG. 5 is an exploded view of a battery cell assembly utilized in the battery system of FIG. 1.
Figure 6:
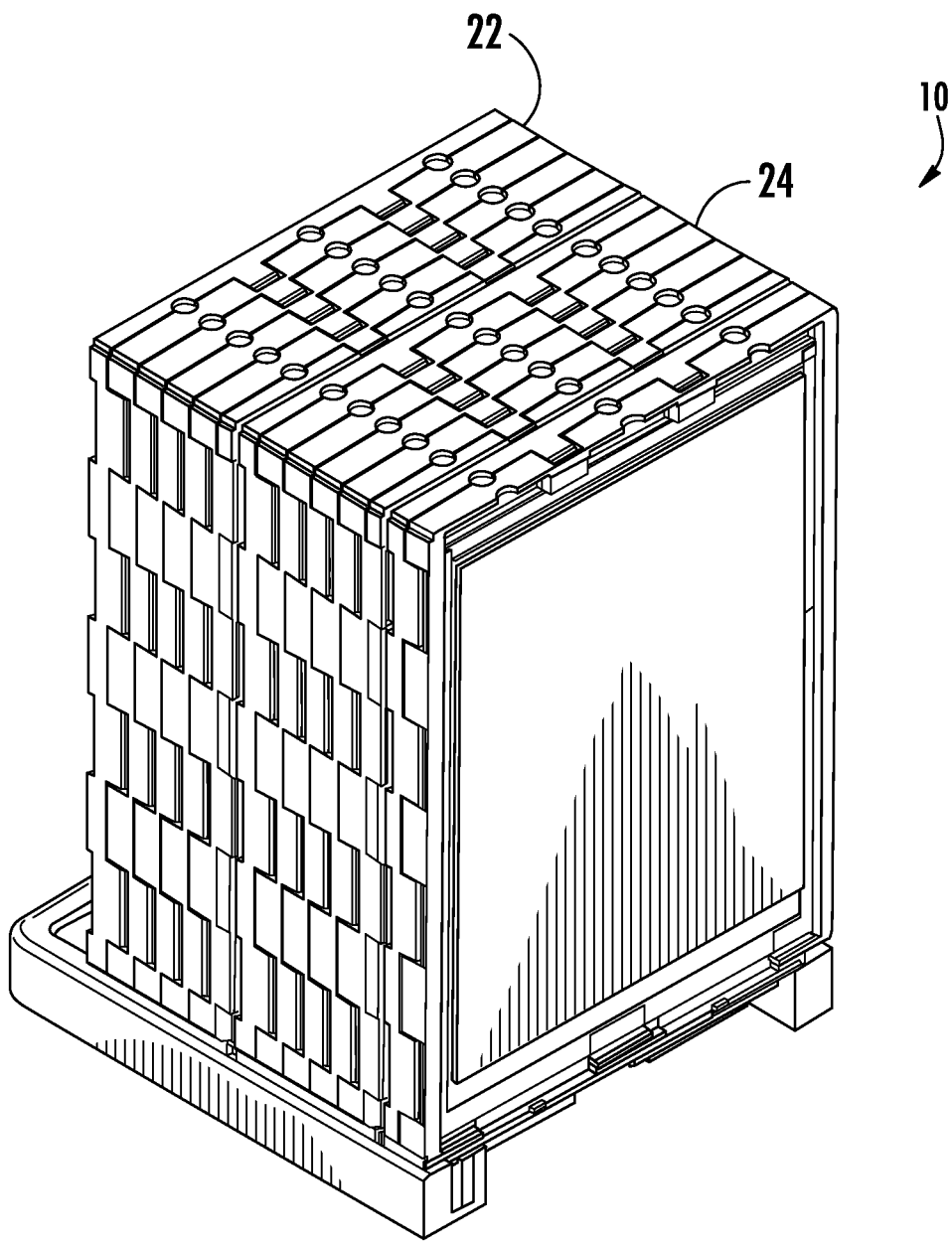
FIG. 6 is a cross-sectional view of the portion of the battery system of FIG. 1.

Referring to FIGS. 4-6, the battery cell assemblies 22-28 have an identical structural configuration and each are configured to generate a voltage therein. For purposes of simplicity, only the detailed structural configuration of the battery cell assembly 22 will be explained herein. The battery cell assembly 22 includes frame members 90, 92, 94, 96, 98, 100, battery cells 110, 112, 114, 116, 118, 120, 122, 124, 126, 128, a mounting frame 130, a circuit board 132, and interconnect members 150, 152, 154, 156, 158. In one exemplary embodiment, the battery cells 110-128 are lithium-ion pouch-type battery cells. Of course, in alternative embodiments, the battery cells could be another type of battery cell known to those skilled in the art.

Referring to FIG. 5, the frame members 90, 92 were configured to be coupled together and to hold the battery cells 110, 112 therebetween. The frame members 92, 94 are configured to be coupled together and to hold the battery cells 114, 116 therebetween. The frame members 94, 96 are configured to be coupled together and to hold the battery cells 118, 120 therebetween. Further, the frame members 96, 98 are configured to be coupled together and to hold the battery cells 122, 124 therebetween. Finally, the frame members 98, 100 are configured to be coupled together and to hold the battery cells 126, 128 therebetween.

The mounting frame 130 is configured to hold the circuit board 132 thereon. The mounting frame 130 is disposed on a top region of the battery cell assemblies 22-28.

The circuit board 132 is configured to hold the interconnect members 150, 152, 154, 156, 158 thereon. The interconnect members 150-158 are electrically coupled to cell tabs extending from the battery cells 110-128 for electrically coupling in series the battery cells 110-128.

Figure 9:
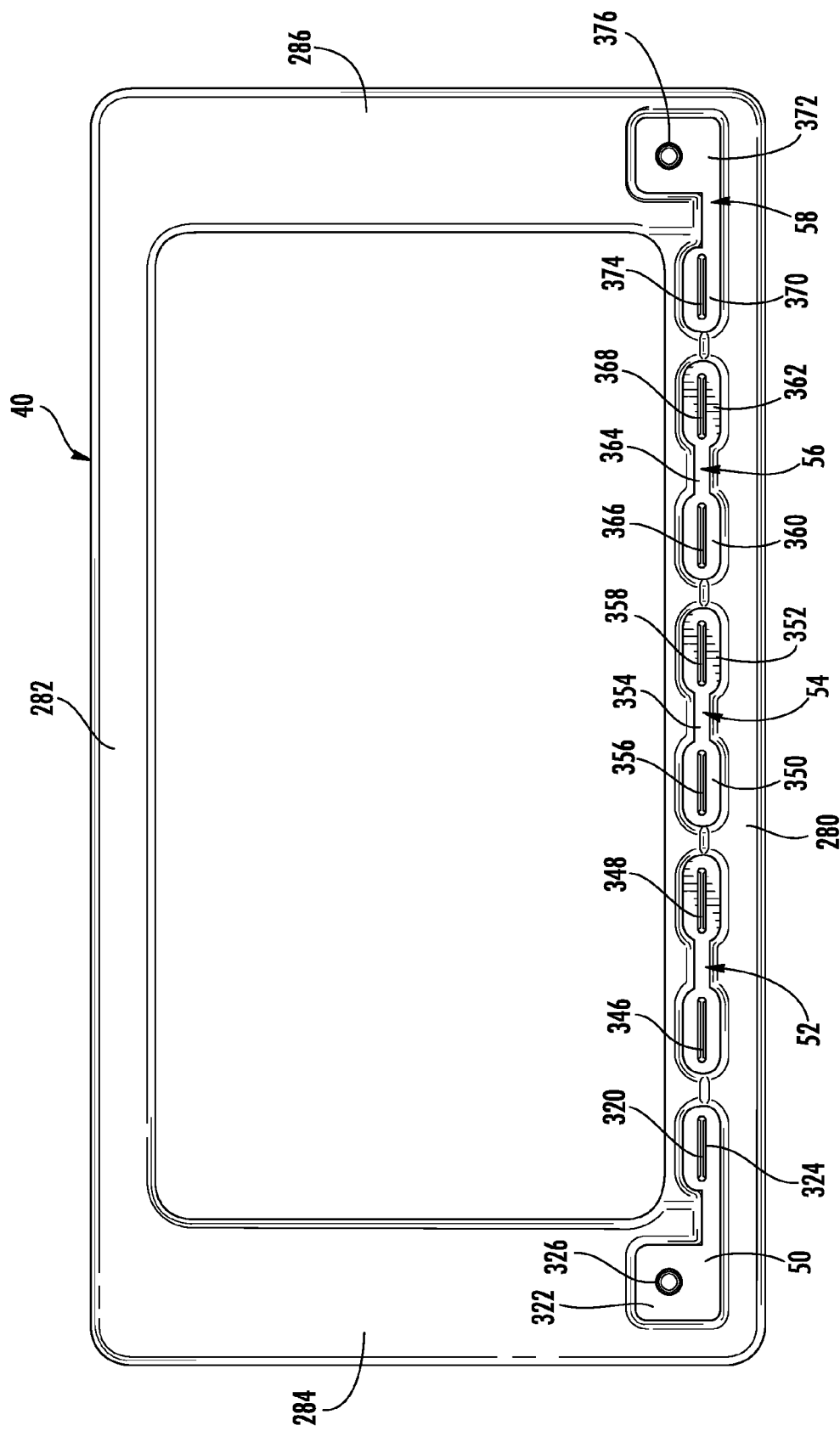
FIG. 9 is a top view of the electrically non-conductive base member and the plurality of bus bar members of FIG. 8.
Figure 10:
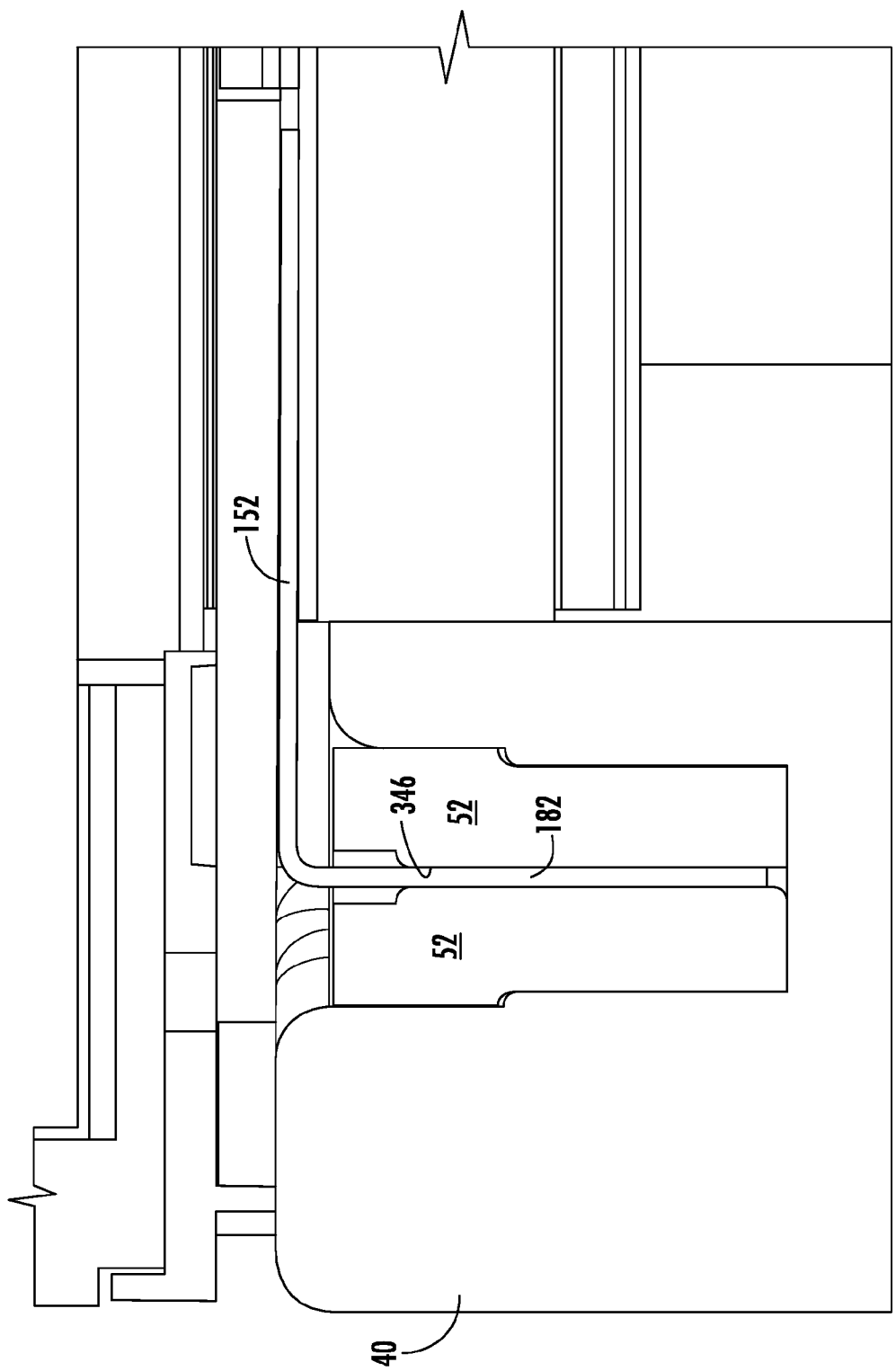
FIG. 10 is an enlarged cross-sectional view of a portion of the battery system of FIG. 1.
Figure 11:
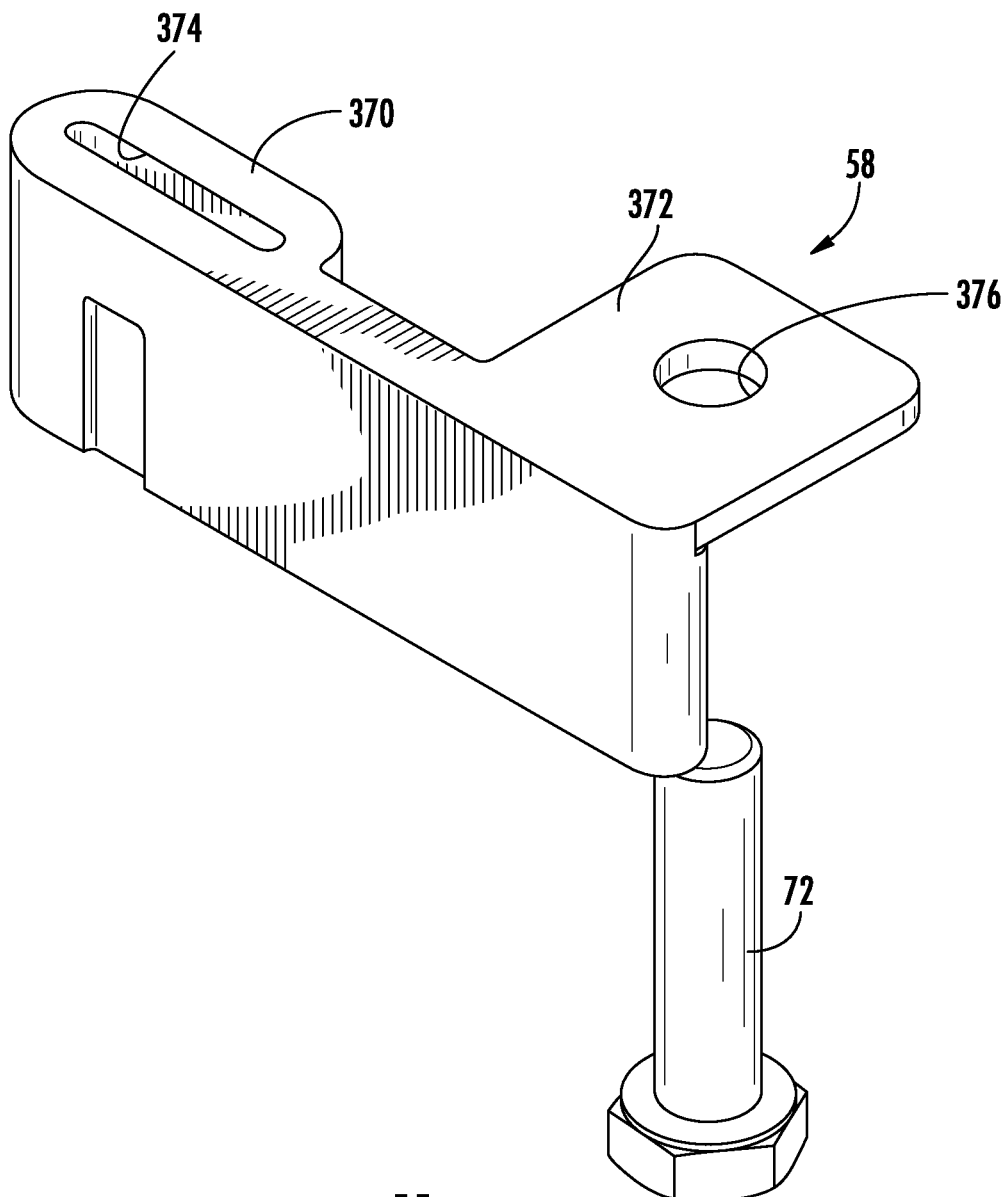
FIG. 11 is a schematic of a first bus bar member and a bolt utilized in the battery system of FIG. 1.
Figure 12:
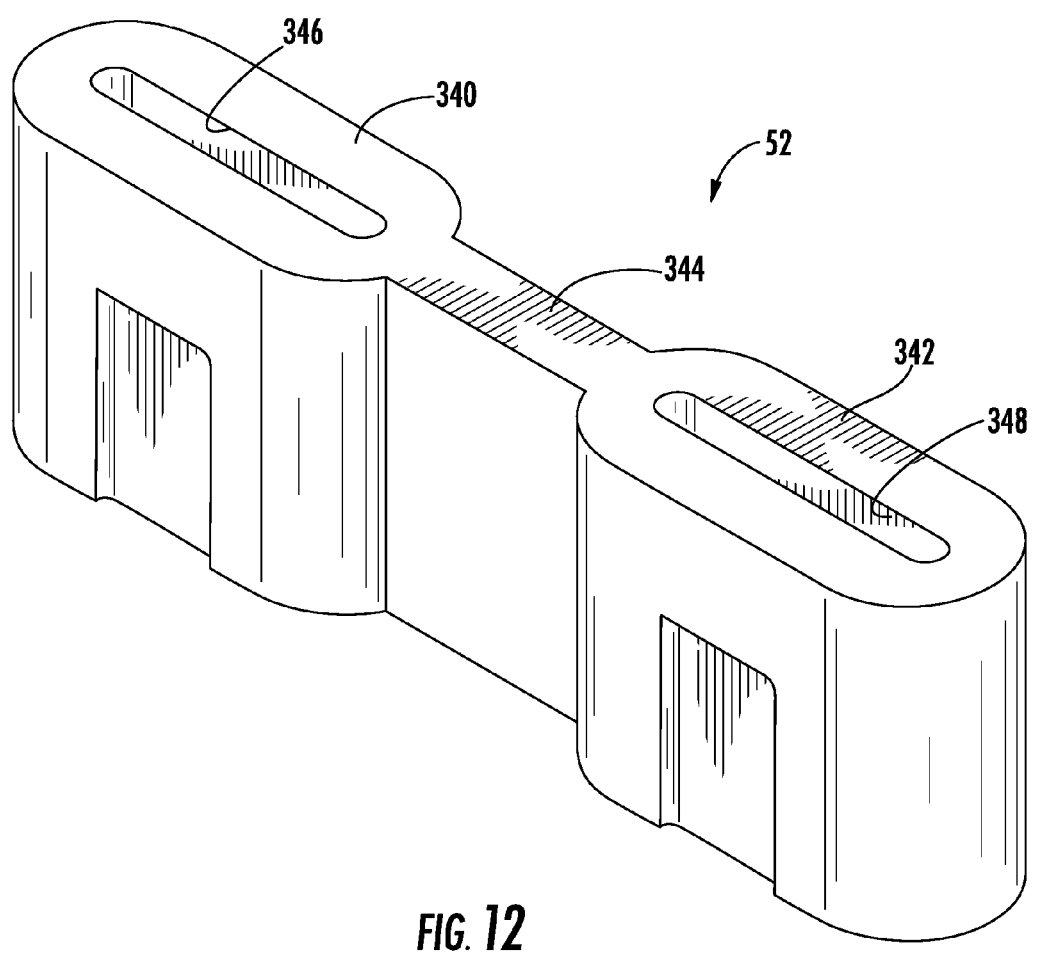
FIG. 12 is a schematic of a second bus bar member utilized in the battery system of FIG. 1.
Figure 13:
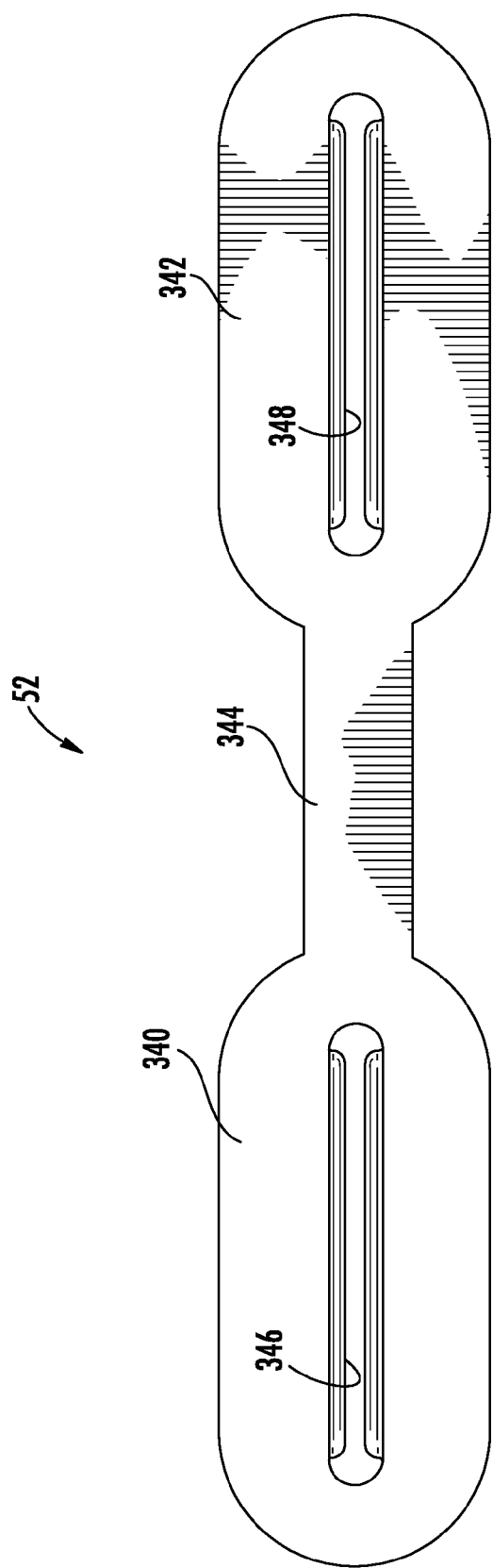
FIG. 13 is a top view of the second bus bar member of FIG. 12.
Figure 14:
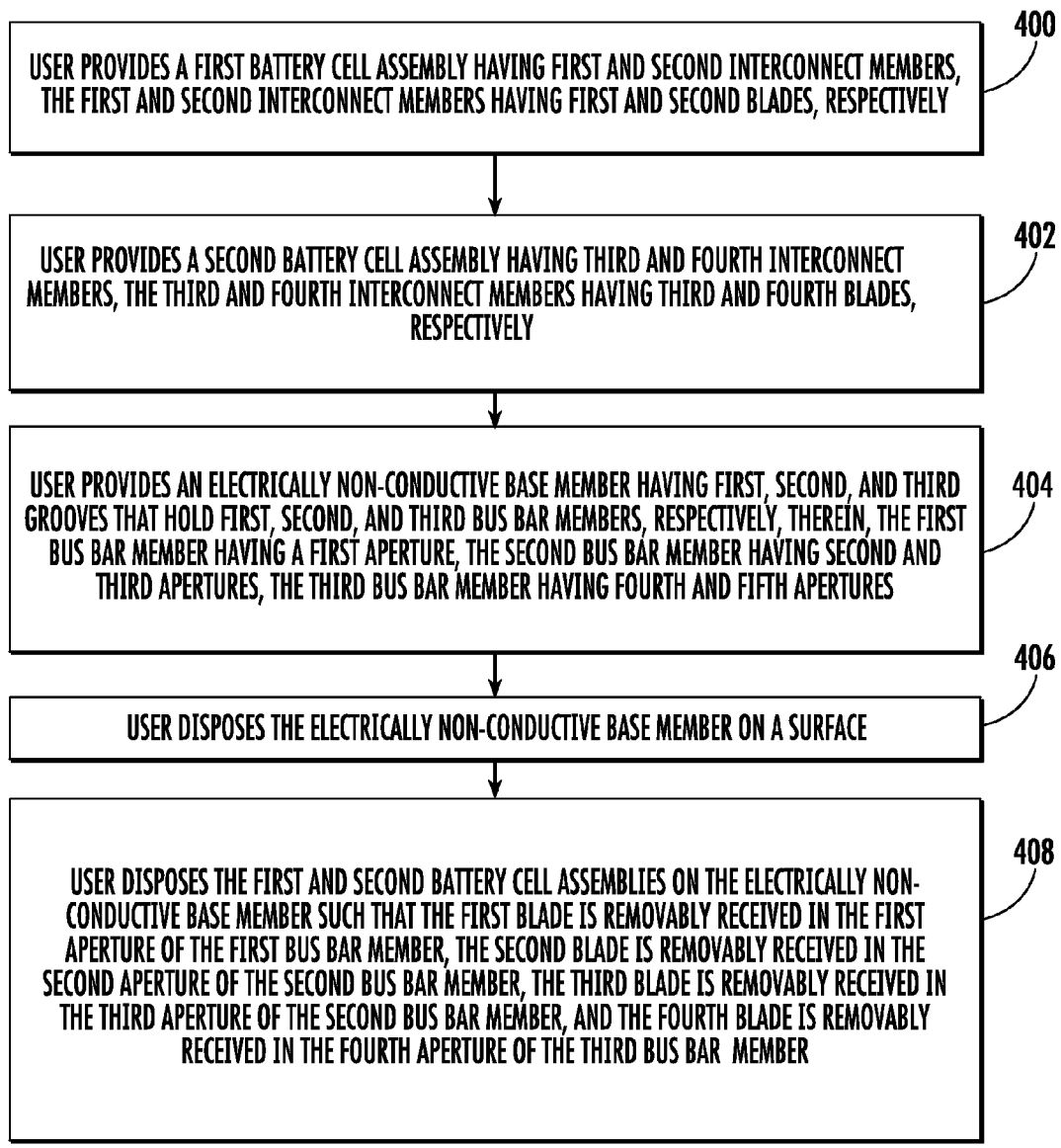
FIG. 14 is a flowchart of a method for coupling first and second battery cell assemblies to an electrically non-conductive base member in accordance with another exemplary embodiment.

Referring to FIGS. 2, 5 and 9, the battery cell assembly 22 has the battery cells 110-128 electrically coupled in series utilizing the interconnect members 150, 152. The interconnect members 150, 152 have a substantially identical structure. The interconnect member 150 includes a U-shaped body portion 170 and a blade 172 extending from an end of the U-shaped body portion 170. The blade 172 is configured to be removably received within an aperture 324 of the bus bar member 50. The interconnect member 152 has a U-shaped body portion 180 and a blade 182 extending from an end of the U-shaped body portion 180. The blade 182 is configured to be removably received within the aperture 346 of the bus bar member 52. The battery cell assembly 22 generates a positive voltage between the blade 172 and the blade 182.

Referring to FIGS. 2 and 9, the battery cell assembly 24 has battery cells electrically coupled in series utilizing the interconnect members 200, 210. The interconnect member 200 has a blade 202, and the interconnect member 210 has a blade 212. The blade 202 is configured to be removably received within the aperture 348 of the bus bar member 52. The blade 212 is configured to be removably received within the aperture 356 of the bus bar member 54. The battery cell assembly 24 generates a positive voltage between the blade 202 and the blade 212.

The battery cell assembly 26 has battery cells electrically coupled in series utilizing the interconnect members 220, 230. The interconnect member 220 has a blade 222, and the interconnect member 230 has a blade 232. The blade 220 is configured to be removably received within the aperture 358 of the bus bar member 54. The blade 222 is configured to be removably received within the aperture 366 of the bus bar member 56. The battery cell assembly 26 generates a positive voltage between the blade 222 and the blade 232.

The battery cell assembly 28 has battery cells electrically coupled in series utilizing the interconnect members 240, 250. The interconnect member 240 has a blade 242, and the interconnect member 250 has a blade 252. The blade 242 is configured to be removably received within the aperture 368 of the bus bar member 56. The blade 252 is configured to be removably received within the aperture 370 of the bus bar member 58. The battery cell assembly 28 generates a positive voltage between the blade 242 and the blade 252.

Figure 8:
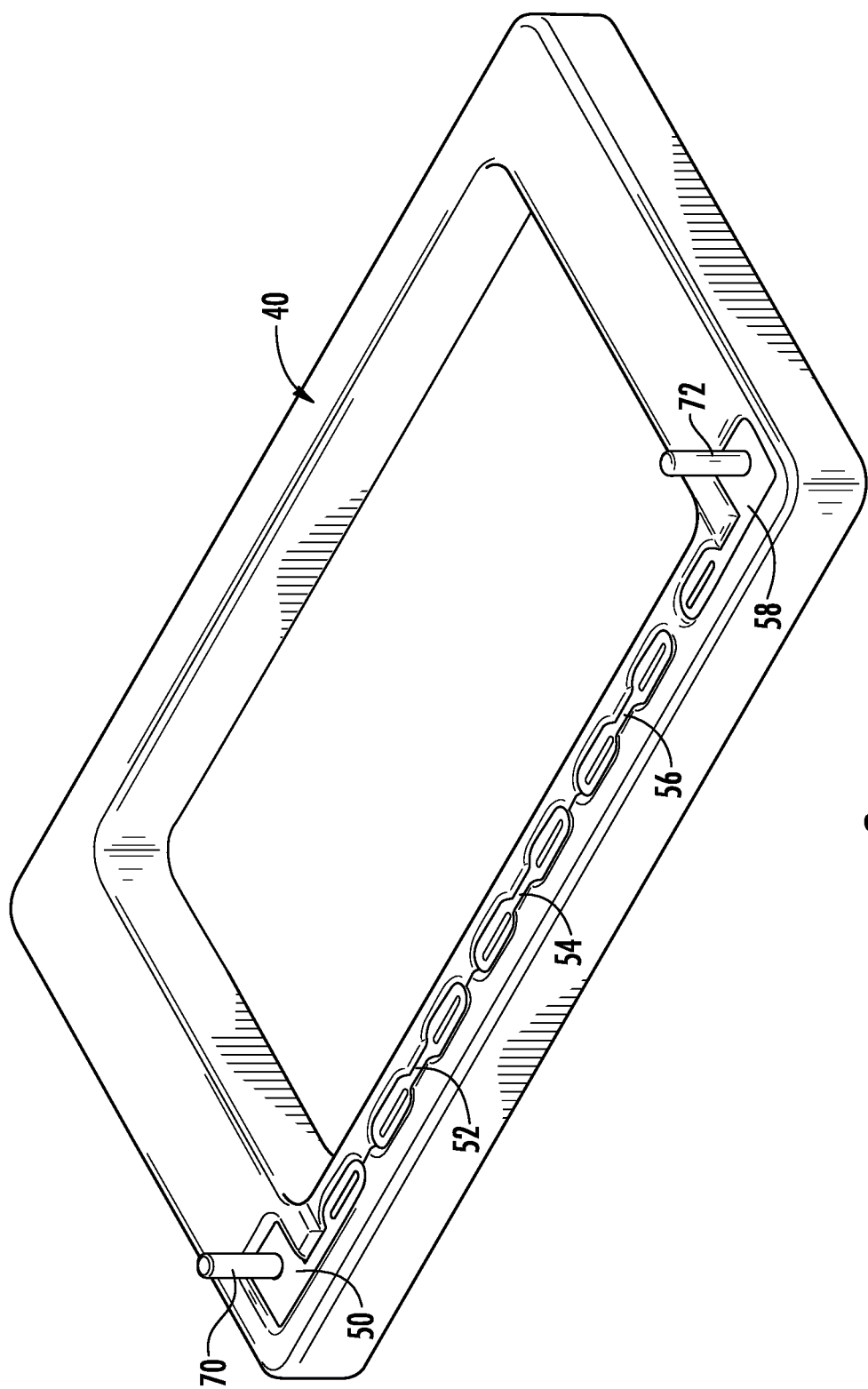
FIG. 8 is another schematic of the electrically non-conductive base member and the plurality of bus bar members of FIG. 7.

Referring to FIGS. 7-9, the electrically non-conductive base member 40 is configured to be removably coupled and electrically coupled to the battery cell assemblies 22, 24, 26, 28. In one exemplary embodiment, the electrically non-conductive base member 40 is a rectangular ring-shaped electrically non-conductive base member that includes peripheral walls 280, 282, 284, 286 that define a central open region 290. The peripheral wall 280 includes grooves 300, 302, 304, 306, 308 that are configured to receive the bus bar members 50, 52, 54, 56, 58, respectively, therein. In one exemplary embodiment, the bus bar members 50-58 are press fit into the grooves 300-308, respectively. In one exemplary embodiment, the electrically non-conductive base member 40 is constructed of plastic. Of course, an alternative embodiment, the member 40 could be constructed of other electrically non-conductive materials known to those skilled in the art.

Referring to FIGS. 2, 7 and 9, the bus bar member 50 includes a body portion 320 and an extension portion 322 that extends from the body portion 320. The body portion 320 includes an aperture 324, and the extension portion 322 includes an aperture 326. The aperture 324 is configured to removably receive the blade 172 therein. The bolt 70 extends through an aperture in the wall 280 and the aperture 326 in the extension portion 322. The bolt 70 is provided to electrically couple the bus bar member 52 to an external load. In one exemplary embodiment, the bus bar member 50 is constructed of copper. However, in alternative embodiments, the bus bar member 50 could be constructed of other electrically conductive materials known to those skilled in the art.

Referring to FIGS. 2, 9, 10, 12 and 13, the bus bar member 52 includes body portions 340, 342 and an intermediate portion 344 coupled between the body portions 340, 342. The body portion 340 includes an aperture 346, and the body portion 342 includes an aperture 348. The aperture 346 is configured to removably receive the blade 182 therein. The aperture 348 is configured to removably receive the blade 202 therein. In one exemplary embodiment, the bus bar member 52 is constructed of copper. However, in alternative embodiments, the bus bar member 52 could be constructed of other electrically conductive materials known to those skilled in the art.

The bus bar member 54 includes body portions 350, 352 and an intermediate portion 354 coupled between the body portions 350, 352. The body portion 350 includes an aperture 356, and the body portion 352 includes an aperture 358. The aperture 356 is configured to removably receive the blade 212 therein. The aperture 358 is configured to removably receive the blade 222 therein. In one exemplary embodiment, the bus bar member 54 is constructed of copper. However, in alternative embodiments, the bus bar member 54 could be constructed of other electrically conductive materials known to those skilled in the art.

The bus bar member 56 includes body portions 360, 362 and an intermediate portion 364 coupled between the body portions 360, 362. The body portion 360 includes an aperture 366, and the body portion 362 includes an aperture 368. The aperture 366 is configured to removably receive the blade 232 therein. The aperture 368 is configured to removably receive the blade 242 therein. In one exemplary embodiment, the bus bar member 56 is constructed of copper. However, in alternative embodiments, the bus bar member 56 could be constructed of other electrically conductive materials known to those skilled in the art.

Referring to FIGS. 2, 7, 9 and 11 the bus bar member 58 includes a body portion 370 and an extension portion 372 that extends from the body portion 370. The body portion 370 includes an aperture 374, and the extension portion 372 includes an aperture 376. The aperture 374 is configured to removably receive the blade 252 therein. The bolt 72 extends through an aperture in the wall 280 and the aperture 376 in the extension portion 372. The bolt 72 is provided to electrically couple the bus bar member 58 to an external load. In one exemplary embodiment, the bus bar member 58 is constructed of copper. However, in alternative embodiments, the bus bar member 58 could be constructed of other electrically conductive materials known to those skilled in the art.

Referring to FIGS. 2 and 9, a brief explanation of an electrical current flow through the battery system 10 will now be explained for purposes of understanding. An electrical current flows from the blade 172 through the battery cell assembly 22 to the blade 182. From the blade 182, the electrical current flows through the bus bar member 52 to the blade 202. From the blade 202, the electrical current flows through the battery cell assembly 24 to the blade 212. From the blade 212, the electrical current flows through the bus bar member 54 to the blade 222. From the blade 222, the electrical current flows through the battery cell assembly 26 to the blade 232. From the blade 232, the electrical current flows through the bus bar member 56 to the blade 242. From the blade 242, the electrical current flows through the battery cell assembly 28 to the blade 252. From the blade 252, the electrical current flows through the bus bar member 58.

Referring to FIGS. 2, 7, 8, 9 and 14, a flowchart of a method for coupling the battery cell assemblies 22 and 24 to the electrically non-conductive base member 40 in accordance with another exemplary embodiment will now be explained. For purposes of simplicity, only the battery cells assemblies 22 and 24 will be discussed in the following method. However, it should be understood that a plurality of additional battery cell assemblies could be coupled to the electrically non-conductive base member 40.

At step 400, the user provides the battery cell assembly 22 having interconnect members 150, 152. The interconnect members 150, 152 have blades 172, 182, respectively.

At step 402, the user provides the battery cell assembly 24 having the interconnect members 200, 210. The interconnect members 200, 210 have blades 202, 212, respectively.

At step 404, the user provides the electrically non-conductive base member 40 having grooves 300, 302, 304 that hold bus bar members 50, 52, 54, respectively, therein. The bus bar member 50 has an aperture 324. The bus bar member 52 has apertures 346, 348. The bus bar member 54 has apertures 356, 358.

At step 406, the user disposes the electrically non-conductive base member 40 on a surface 410 (shown in FIG. 1).

At step 408, the user disposes the battery cell assemblies 24, 24 on the electrically non-conductive base member 40 such that the blade 172 is removably received in the aperture 324 of the bus bar member 50, the blade 182 is removably received in the aperture 346 of the bus bar member 52, the blade 202 is removably received in the aperture 348 of the bus bar member 52, and the blade 212 is removably received in the aperture 356 of the bus bar member 54.

The battery system and the method for coupling the battery cell assemblies to an electrically non-conductive base member provide a substantial advantage over other battery systems and methods. In particular, the battery system and method provide a technical effect of removably coupling blades of the battery system into bus bar members in an electrically non-conductive base member to greatly simply installation of the battery cell assemblies.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A battery system, comprising:
a first battery cell assembly having a bottom side and first and second interconnect members disposed on the bottom side, the first and second interconnect members having first and second blades, respectively;
an electrically non-conductive base member having a top side with first and second grooves extending from the top side into the electrically non-conductive base member, the top side of the electrically non-conductive base member having an outer periphery larger than an outer periphery of the bottom side of the first battery cell assembly, the electrically non-conductive base member further having first, second, third, and fourth walls; the first and second walls being disposed substantially parallel to one another; the third and fourth walls being disposed substantially parallel to one another and perpendicular to the first and second walls; the third and fourth walls being coupled to the first and second walls such that the first, second, third, and fourth walls define a central open region; the first wall having the first and second grooves extending therein; and
first and second bus bar members disposed in the first and second grooves, respectively, of the electrically non-conductive base member, the first bus bar member having a first aperture configured to removably receive the first blade therein, the second bus bar member having a second aperture configured to removably receive the second blade therein; and
the bottom side of the first battery cell assembly being disposed on and supported by the top side of the electrically non-conductive base member such that the first blade is removably received within the first aperture, and the second blade is removably received in the second aperture.

2. The battery system of claim 1, wherein the first battery cell assembly is configured to generate a voltage between the first and second blades such that an electrical current flows through the first battery cell assembly from the first blade to the second blade and then through the second bus bar member.

3. The battery system of claim 1, wherein the first and second bus bar members are disposed a predetermined distance apart from one another.

4. The battery system of claim 1, wherein the second bus bar member further includes a third aperture therein, the battery system further comprising:
a second battery cell assembly having third and fourth interconnect members, the third and fourth interconnect members having third and fourth blades, respectively, the third aperture configured to removably receive the third blade therein; and
a third bus bar member disposed in a third groove of the electrically non-conductive base member, the third bus bar member having a fourth aperture configured to removably receive the fourth blade therein.

5. The battery system of claim 1, wherein the electrically non-conductive base member is a rectangular ring-shaped base member defining a central open region.

6. The battery system of claim 5, wherein the first and second bus bar members are disposed along a longitudinal axis extending along one of the walls of the rectangular ring-shaped base member.

7. The battery system of claim 1, wherein the electrically non-conductive base member is constructed of plastic.

8. The battery system of claim 1, further comprising a bolt, wherein the first bus bar member further includes a body portion and an extension portion, the extension portion extending from the body portion and having an aperture extending therethrough, the bolt configured to extend through an aperture of the electrically non-conductive base member and the aperture of the body portion of the first bus bar member.

9. The battery system of claim 1, wherein the second bus bar member further includes first and second body portions, and an intermediate portion coupled to the first and second body portions, the first body portion having the second aperture therein, the second body portion having a third aperture therein.

10. A method for coupling a first battery cell assembly to an electrically non-conductive base member, the first battery cell assembly having a bottom side and first and second interconnect members disposed on the bottom side, the first and second interconnect members having first and second blades, respectively, the method comprising:

providing an electrically non-conductive base member having a top side with first and second grooves extending from the top side into the electrically non-conductive member, the first and second grooves holding first and second bus bar members, respectively, therein, the first bus bar member having a first aperture, the second bus bar member having a second aperture, the top side having an outer periphery larger than an outer periphery of the bottom side of the first battery cell assembly, the electrically non-conductive base member further having first, second, third, and fourth walls; the first and second walls being disposed substantially parallel to one another; the third and fourth walls being disposed substantially parallel to one another and perpendicular to the first and second walls; the third and fourth walls being coupled to the first and second walls such that the first, second, third, and fourth walls define a central open region; the first wall having the first and second grooves extending therein;

disposing the electrically non-conductive base member on a surface; and disposing the bottom side of the first battery cell assembly on the top side of the electrically non-conductive base member such that the top side supports the bottom side, and the first blade is removably received in the first aperture, and the second blade is removably received in the second aperture.

11. The method of claim 10, wherein the second bus bar member further includes a third aperture therein, and a third bus bar member has a fourth aperture and is disposed in a third groove of the electrically non-conductive base member, and a second battery cell assembly has third and fourth interconnect members, the third and fourth interconnect members having third and fourth blades, respectively, the method further comprising:

disposing the second battery cell assembly on the electrically non-conductive base member such that the third blade is removably received in the third aperture of the second bus bar member, and the fourth blade is removably received in the fourth aperture of the third bus bar member.

12. The battery system of claim 1, wherein the first aperture is an elongated aperture configured to removably receive the first blade therein.

13. The battery system of claim 1, wherein the first and second bus bar members are disposed along a longitudinal axis extending along the first wall.

14. The battery system of claim 1, wherein the bottom side of the first battery cell assembly is disposed on the first, second, and third walls.

15. A battery system, comprising:

a first battery cell assembly having a bottom side and first and second interconnect members disposed on the bottom side, the first and second interconnect members having first and second blades, respectively;

an electrically non-conductive base member having first, second, third and fourth walls defining a top side; the first and second walls being disposed substantially to parallel to one another; the third and fourth walls being disposed substantially parallel to one another and perpendicular to the first and second walls; the third and fourth walls being coupled to the first and second walls such that the first, second, third, and fourth walls define a central open region; the first wall having first and second grooves extending from the top side into the first wall; and first and second bus bar members disposed in the first and second grooves, respectively, of the first wall, the first bus bar member having a first elongated aperture, the second bus bar member having a second elongated aperture; and the bottom side of the first battery cell assembly being disposed on and supported by the top side of the electrically non-conductive base member such that the first blade is removably received within the first elongated aperture, and the second blade is removably received in the second elongated aperture.

16. The battery system of claim 15, further comprising a bolt, wherein the first bus bar member further includes a body portion and an extension portion, the extension portion extending from the body portion and having an aperture extending therethrough, the bolt configured to extend through an aperture of the first wall of the electrically non-conductive base member and the aperture of the body portion of the first bus bar member.

17. The battery system of claim 15, wherein the top side of the electrically non-conductive base member has an outer periphery larger than an outer periphery of the bottom side of the first battery cell assembly.

* * * * *